US006243376B1

(12) United States Patent
Ng et al.

(10) Patent No.: US 6,243,376 B1
(45) Date of Patent: Jun. 5, 2001

(54) METHOD AND APPARATUS FOR MAKING A PHONE CALL CONNECTION OVER THE INTERNET CONNECTION

(75) Inventors: Ede Phang Ng; Eng Choon Loh, both of Singapore (SG)

(73) Assignee: MediaRing.com Ltd., Singapore Post Centre (SG)

(*) Notice: Subject to any disclaimer, the term of this patent is extended or adjusted under 35 U.S.C. 154(b) by 0 days.

(21) Appl. No.: 08/963,543

(22) Filed: Nov. 3, 1997

Related U.S. Application Data

(63) Continuation-in-part of application No. 08/910,887, filed on Aug. 13, 1997.

(51) Int. Cl.[7] .................................................. H04L 12/66
(52) U.S. Cl. .............................................................. 370/352
(58) Field of Search ..................................... 370/352, 353, 370/380, 389, 392, 396, 401, 404, 427, 435, 450, 465, 485; 379/90.01, 93.01, 93.05, 93.09, 100.15, 100.16

(56) References Cited

U.S. PATENT DOCUMENTS

| | | | |
|---|---|---|---|
| 5,303,301 | * 4/1994 | Takahata | 379/142 |
| 5,434,797 | 7/1995 | Barris | 364/514 |
| 5,452,289 | 9/1995 | Sharma et al. | |
| 5,471,470 | 11/1995 | Sharma et al. | |
| 5,533,115 | 7/1996 | Hollenbach | 379/220 |
| 5,600,649 | 2/1997 | Sharma et al. | 370/435 |
| 5,608,786 | * 3/1997 | Gordon | 379/100 |
| 5,636,216 | 6/1997 | Fox et al. | 370/402 |
| 5,726,984 | * 3/1998 | Kubler et al. | 370/349 |
| 5,764,627 | 6/1998 | Sharma et al. | 370/271 |
| 5,867,495 | * 2/1999 | Elliott et al. | 370/352 |
| 6,009,469 | * 12/1999 | Mattaway et al. | 709/227 |
| 6,011,794 | * 1/2000 | Mordowitz et al. | 370/389 |
| 6,064,653 | * 5/2000 | Farris | 370/237 |

FOREIGN PATENT DOCUMENTS

| | | |
|---|---|---|
| 0 781 016 A2 | 6/1997 | (EP) . |
| WO 96/38018 | 11/1996 | (WO) . |
| WO 97/35416 | 9/1997 | (WO) . |
| WO 98/11704 | 3/1998 | (WO) . |
| WO 98/3008 | 7/1998 | (WO) . |
| WO 98/35481 | 8/1998 | (WO) . |
| WO 99/09732 | 2/1999 | (WO) . |

OTHER PUBLICATIONS

Davis, J. "The Net", C/NET, Jul. 3, 1996 www.new.com.
"Business & Technolgoy" U.S. News on Line, Apr. 15, 1996, www.usnews.com.

* cited by examiner

*Primary Examiner*—Ajit Patel
(74) *Attorney, Agent, or Firm*—Fenwick & West LLP

(57) ABSTRACT

The present invention includes a method or Internet phone for automatically dialing up a phone call connection across an Internet connection. Initially the caller manually dials a recipient's telephone number, and once the telephone call connection is made, the caller party's Internet phone automatically starts a dialing routine which notifies the recipient party's Internet phone that a phone call connection over an Internet connection is desired. The dialing may be a differential ringing sequence or a single ringing interval. Upon the dialing routine being detected by the recipient party's Internet phone, the parties end the telephone connection and proceed to make separate connections to the Internet, including a connection to a Lightweight Directory Access Protocol (LDAP). The caller party and recipient party Internet phones submit their respective Internet protocol address and telephone numbers. The caller party additionally submits the recipient Internet phone's telephone number. Then the Internet connection for the intended phone call is automatically completed. Alternatively, the differential dialing routine can be performed by a knocking server on the Internet, and a directory server on the Internet can match callers and recipients by their respective telephone numbers. Additionally, the knocking server permits caller equipment to be without dialing capabilities as these are now at the knocking server.

12 Claims, 6 Drawing Sheets

METHOD AND APPARATUS FOR MAKING A PHONE CALL CONNECTION OVER THE INTERNET CONNECTION

RELATED APPLICATION

This is a continuation-in-part of Application Ser. No. 08/910,887, entitled METHOD AND APPARATUS FOR MAKING A PHONE CALL CONNECTION OVER AN INTERNET CONNECTION, filed Aug. 13, 1997.

FIELD OF THE INVENTION

This invention relates to phone communications and more particularly to a method and apparatus for automatically setting up a phone call connection over an Internet connection.

BACKGROUND OF THE INVENTION

Typically, voice communication over the Internet works by using the combination of networks that make up a user Internet connection rather than the telecommunications network provided by a local or long distance company. Instead of talking into a telephone, a user speaks into a personal computer (PC) equipped with a microphone, speaker and a sound card. On the Internet, the voice traffic is treated as just a particular kind of data. The voice traffic, converted into bit form, is transmitted as data packets under the existing Internet protocol suites, TCP/IP (Transmission Control Protocol/IP), that facilitate the reliable exchange of data between computers over the Internet. The TCP program layer divides the voice-based data file into one or more packets, numbers the packets, and then forwards the packets to the IP program layer. The IP program layer handles the addressing of each data packet that is transmitted from one computer to another on the Internet. Essentially, the TCP/IP protocol suites manage the assembly and reassembly of data into data packets that are transmitted and received across the Internet.

Typical connection procedures across an Internet require configuration of computer hardware with a software routine which allows connection with an Internet service provider, and another software routine which accesses a server configured computer across the Internet via established protocols. These Internet connection procedures, which have evolved with computer to computer communications in mind, lack the automated phone call connection procedures available with a telephone call connection. To make a telephone call connection, a caller simply dials a telephone number of a recipient.

Accordingly, there is a need to provide a method and apparatus for automatically establishing a phone call over an Internet connection.

SUMMARY OF THE INVENTION

The present invention provides a method for automatically establishing a phone call over an Internet connection. The method includes using a dialing routine with a telephone call connection to notify of an intended phone call over an Internet connection by caller party communication equipment to recipient party communication equipment in response to a manual dialing of the telephone call connection at the caller party communication equipment. Then each of the caller and recipient party communication equipment automatically undertake to make an Internet connection and then a connection to a directory service on the Internet. The caller party communication equipment automatically provides its Internet protocol address and telephone number, and the recipient party communication equipment's telephone number. The recipient party communication equipment automatically provides its Internet protocol address and telephone number. Then the caller and recipient party communication equipment automatically complete the Internet connection between themselves for the intended phone call.

In an alternative aspect of the present invention, there is provided a method for automatically establishing a phone call over an Internet connection, wherein a caller party automatically dials a telephone number of a recipient party to establish a telephone phone call connection. The caller party automatically initiates a dialing routine to notify the recipient party of an intended phone call connection across an Internet connection. The caller and recipient parties automatically end the telephone call connection in response to the recipient party detecting the dialing routine by the caller party. The caller and recipient parties each automatically undertake to make a separate connection with an Internet service provider and then make a connection to a directory service on the Internet. Each of the caller and recipient parties automatically provide their respective Internet protocol address and telephone number, and the caller party submits the recipient party's telephone number. Each of the caller and recipient party automatically complete the Internet connection for the intended phone call connection.

In a further aspect of the present invention, there is provided an Internet phone. The Internet phone includes memory means for storing executable programs including operating routines, Internet related protocols, a dialing routine for selective automatic call dialing and call detection across a telephone call connection to notify of an intended phone call over an Internet connection, and a connection routine for automatically establishing the Internet connection for the intended phone call between a selectively intended caller and recipient of the intended phone call. The connection routine is responsive to the dialing routine, and the dialing routine is responsive to a manual dialing of the telephone call connection. A processor means is coupled to the memory means for downloading and processing the executable programs. A display means is coupled to the processor means for indicating when the Internet connection is established. A relay means, for selectively switching between an audio device and a telephone switching network, is responsive to the processor means. An audio interface means is coupled between the relay means and the processor means for selectively converting an audio signal from an audio device into a digital signal for the processor means and converting a digital signal from the processor means into an audio signal for the audio device. The audio interface means is responsive to the processor means. A telephone network interface means is coupled between the processor means and the relay means for selectively converting a digital signal from the processor means into an analog signal for transmission across the telephone switching network, and converting an analog signal received from across the telephone switching network into a digital signal for the processor means. The telephone network interface means is responsive to the processor means.

In a further aspect of the present invention, there is provided a method for establishing a phone call over an Internet connection, the method comprising the steps of: making an Internet connection by caller party communication equipment intending to establish a phone call connection over the Internet connection with recipient party communication equipment; providing by the caller party communication equipment, the caller party communication equipment's Internet Protocol address and telephone number and the recipient party communication equipment's telephone number to a directory server and knocking server on the Internet connection; notifying automatically by the knocking server to the recipient party communication equipment of an intended phone call connection over the Internet connection, the notifying being a dialing routine over a telephone call connection to the recipient party communication equipment; making an Internet connection by the recipient party communication equipment in response to the recipient party communication equipment detecting the dialing routine by the knocking server; providing automatically, by the recipient party communication equipment, the recipient party communication equipment's Internet protocol address and telephone number to the directory server; and completing automatically the Internet connection between the caller and recipient party communication equipment for the intended phone call.

BRIEF DESCRIPTION OF THE DRAWINGS

Preferred features of the present invention can be best understood by reference to the description in conjunction with the following drawing figures, with like reference numerals indicating like components or steps, in which.

DETAILED DESCRIPTION OF PREFERRED EMBODIMENTS

Figure 1:
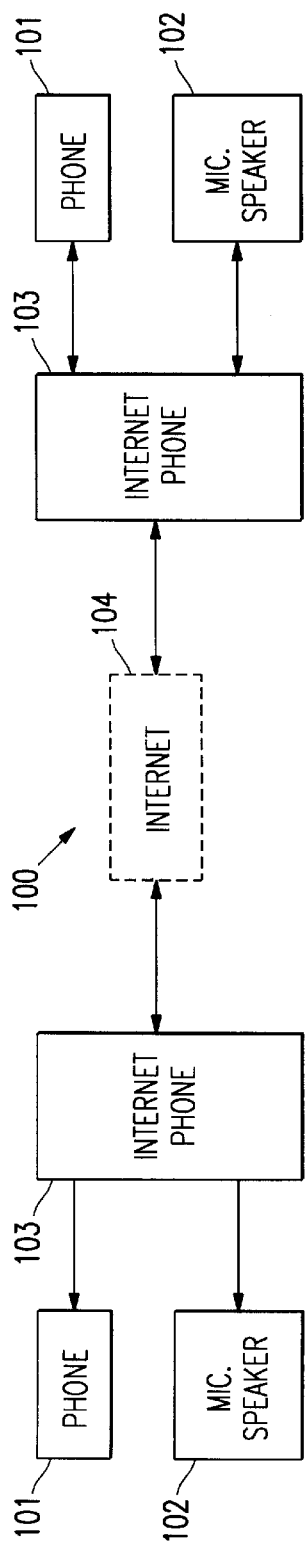
FIG. 1 is a block diagram of an Internet based phone system configuration in accordance with the present invention.

Referring to FIG. 1 there is shown a block diagram of an Internet phone system configuration in accordance with the present invention. One caller or recipient party communication equipment end consists of an Internet phone 103 connected to an external phone 101 or a microphone-speaker set 102 (i.e. audio device). The other recipient or caller party communication equipment end includes an identical Internet phone 103 connected to an external phone 101 or microphone-speaker set 102. The caller and recipient party communication equipment ends communicate over an Internet connection 104. A caller party Internet phone 103 processes voice deliveries from the phone 101 or microphone-speaker 102 set into a data packet format suitable for transmission over the Internet 104. The recipient party Internet phone 103 processes the incoming data packet format into audio signals reproducible as voice through the phone 101 or microphone-speaker set 102. Full duplex communications are achieved by each Internet phone 103 transmitting and receiving over the Internet 104 as well as converting voice to data packets or data packets to voice.

The Internet 104, over which the Internet phones 103 transmit and receive, refers to a collection of networks and gateways interconnecting dissimilar networks that transfer information under the TCP/IP (Transmission Control Protocol/Internet Protocol) suite of protocols. The TCP/IP is a two layer program that each Internet user uses to transmit or receive over the Internet 104. The TCP (Transmission Control Protocol) manages the packaging of data into packets that get routed on different paths across the Internet and reassembled at their destination. The IP (Internet Protocol) handles the address part of each data packet so that it is routed to the right destination.

Although the TCP and IP protocols are the most important, TCP/IP is really a suite of protocols including SLIP (Serial Line Internet Protocol) and PPP (Point-to-Point Protocol). SLIP is used for communications between two machines that were previously configured for communication with each other. For example, an Internet Service Provider (ISP) may provide a user with a SLIP connection so that one ISP's server can respond to the user's requests, pass them on to the Internet, and forward the user's requested Internet responses back to the user. A PPP connection with an ISP is like the SLIP connection. However, PPP is usually preferred over SLIP because PPP can handle synchronous as well as asynchronous communication. PPP can share a line with other users and has error detection which SLIP lacks.

Figure 2:
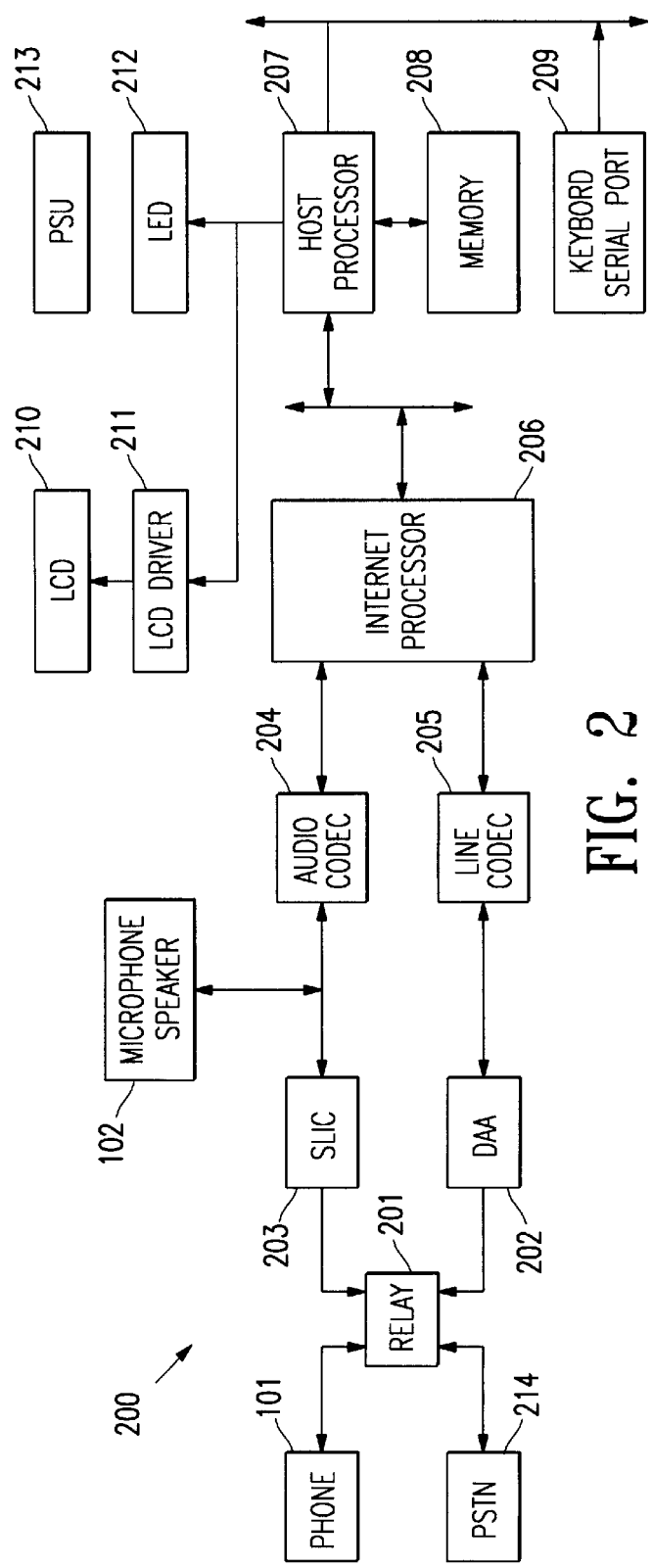
FIG. 2 is a block diagram detailing an Internet phone set-top box shown in FIG. 1.

Referring now to FIG. 2 there is shown a block diagram 200 detailing the Internet phone 103 discussed with respect to FIG. 1. The external phone 101 is connected to a relay 201 which is operable in a normal mode and an Internet mode. In the normal mode, the external phone 101 becomes connected to the Public Switched Telephone Network (PSTN) 214 and allows the user to make or receive local or long distance calls directly through the PSTN. In the Internet mode, the external phone 101 or microphone-speaker set 102 is connected to SLIC (Subscriber Loop Interface Circuitry) and used as an audio headset.

Coupled between the relay 201 and an Internet processor 206, is an audio interface circuitry which includes the SLIC (Subscriber Loop Interface Circuitry) 203, and an audio range multiplexer and coder-decoder (Audio Codec) 204. The audio interface circuitry converts an audio signal from the phone 101 or microphone-speaker set 102 (i.e., audio device) into a digital format suitable to be processed by the Internet processor. Also, the audio interface circuitry converts a audio digital signal from the processor into an audio signal that is reproducible through the phone 101 (or microphone-speaker set 102) as voice.

The SLIC 203 is an integrated circuit, widely used as an interface in the telephone switching networks, that provides what is known as the BORSCHT functions in telephony (Battery Feed, Over-voltage Protection, Ringing, Signaling Coding, Hybrid and Test). The SLIC 203 converts 2-wire circuit analog audio signals received from the audio device (i.e. phone 101) into 4-wire circuit analog audio signals. The SLIC 203 also converts received 4-wire circuit analog audio signals back into 2-wire circuit analog audio signals which are sent to the phone 101 (or microphone speaker set 102). Because phones 101 send and receive on a 2-wire pair and the audio decoder-encoder 204 send and receive between each other on 4-wire circuits, the SLIC 203 includes a so-called hybrid network. This hybrid network converts the 2-wire audio into separate send and receive paths in a 4-wire line. The audio multiplexer 204 converts the 4-wire circuit analog signal from the SLIC 203 or microphone-speaker set 102 into a signal which is encoded by the Codec 204. The Codec 204 preferably uses a pulse code modulation (PCM) technique, which is a method of modulation in which signals are sampled and converted to digital words that are then transmitted serially. Most PCM systems use either 7- or 8-bit binary codes. There are, however, several standards for PCM coding: most common are µ-Law in North America and A-Law in Europe (both based on logarithmic conversion of the signal). Also, the Codec and audio multiplexer 204 decode and de-multiplex, respectively, digital signals coming from the Internet processor 206, to provide an analog signal suitable for the SLIC 203 to process and send to the phone 101 or microphone-speaker set 102. Further configuration and function details of the SLIC 203 and Audio/Codec 204 are well known to those of ordinary skill in the art and need not be discussed in greater detail herein.

Also coupled between the relay 201 and the Internet processor 206 is telephone network interface circuitry, which converts the digital audio from the Internet processor 206 into an analog format suitable for transmission across the PSTN 214. The telephone network interface circuitry also converts an analog signal received from across the PSTN 214 into a digital format suitable for the Internet processor 206. The telephone network interface circuitry includes a DAA (Data Access Arrangement) 202 and a Line Codec (Coder-Decoder) 205. The DAA 202 is a universal 2 to 4 wire hybrid circuitry interface to the PSTN 214 that provides device surge protection, line impedance matching, call process detection and 2-wire to 4-wire hybrid conversion. The Line Codec 204 is a high performance 16 bit linear audio range, analog-to-digital and digital-to-analog converter (ADC and DAC). Further configuration and function details of the DAA 202 and Line Codec 205 are well known to those of ordinary skill in the art and need not be discussed in greater detail herein.

The Internet processor 206 is a high performance Digital Signal Processing (DSP) chip operable to process executable programs such as modem (Modulation-Demodulation) algorithms including V.80 and V.34+, speech related algorithms including G.723.1 and G.729, and acoustic echo cancellation algorithms.

Modem algorithms enable communications over a standard telephone network line in the PSTN by converting digital signals to analog and vice versa. Modem standards are set by the International Telecommunication Union (ITU) and assure compatibility between users transmitting and users receiving, and vice versa. The V.34+standard is an ITU recommended standard for transmission rates up to 33,600 baud. The V.80 standard is an ITU recommended standard, which provides for in-band signaling and synchronous data modes that enable users to exchange not only voice and data, but also video, over a single analog phone line. The three main functions of a modem under the V.80 standard are: synchronous data stream run on asynchronous modem connections, rate adjustments based on line conditions, communications of lost data packets to help keep real time audio and video flowing to both sides of a communication loop.

Speech related algorithms provide speech coding and decoding to facilitate transmissions over the analog based telephone lines of the PSTN. The speech algorithm standard G.7231, an ITU recommended standard, is a dual rate speech coder for multi-media communications transmitting at 5.3 and 6.3 kilobits per second. The ITU recommended G.729 standard is a speech coding and decoding standard that provides 4 kHZ speech band width at a bit rate of 8 Kilobits per second. The standard specifies a Code Excited Linear Predictive (CELP) coder that uses an algebraic code-book to code the excitation signal. The codes operate on speech frames of 10 sec (80 samples at an 8 kHZ sample rate), completes the long-term predictor coefficients, and operates in an analysis-by-synthesis loop to find the excitation vector that minimizes the perceptually weighted error signal.

The Internet Processor 206 is bidirectionally coupled to a host processor 207 with on-board memory 208. The on-board memory is preferably EEPROM (Electrically Erasable Programmable Read Only Memory), but other nonvolatile memory types may be used. On top of the operating system, the targeted executable routines or programs for the host processor 207 are the Internet related functions such as TCP, IP, PPP, etc. Upon the Internet phone 103 being powered on, the host processor 207 downloads, from memory 208, all the necessary host processor executable routines to its instruction and data memory space. The host processor 207 also downloads and transfers the Internet processor's 206 executable routines from the memory 208 to the Internet processor's 206 on-chip instruction and data memory space. After the system executes diagnostic and initialization routines, the Internet phone 103 is operator ready. It is to be noted that different processor and memory configurations are possible for carrying out the above detailed functions. For example a single processor with parallel processing capabilities can be used to process all the executable programs and routines processed by the Internet processor 206 and host processor 207.

The host processor 207 drives an LCD 210 (Liquid Crystal Display) which is an ASCII character display. The LCD 210 displays the mode of operation, (normal or Internet), call ID status of the call progress, and other information pertaining to the operations of the Internet phone 103. The host processor also drives a total of six (6) LED (Liquid Emitting Diode) indicators: power Internet On-Line, call progress, transmit audio, receive audio, and system diagnostic check. The power indicator, when lit, notifies if the power supply unit 213 in the Internet phone 103 has been activated. The Internet On-Line indicates if the Internet phone 103 is connected to the Internet 104. Call progress indicates if calling procedures are being undertaken. Transmit audio, when blinking, indicates that the Internet phone 103 is transmitting audio to a remote Internet phone 103. Receive audio, when blinking, indicates that the Internet phone 103 is receiving audio from a remote Internet phone 103. When the system diagnostic check is lit, the Internet phones 103 internal diagnostic routines have determined that the Internet phone 103 is in good condition and operable.

The Internet phone 103 is provided with a power on-off switch, an Internet call/auto-answer switch, a call toggle switch, a serial port 209, and a general interface port. The Internet call/auto-answer switch provides two functions: as a caller device, the switch indicates the in-coming phone call is through the Internet 104, and as a receiver, the switch indicates that the Internet phone 103 will be automatically connected to the Internet 104 if an Internet routed phone call is detected. The call toggle switch supports call waiting services and allows the user to toggle audio conversations with two parties. The general interface port is an 8/16 slot bus interface which allows for future enhancement. The power switch activates the power supply unit 213, preferably a 12 Volt DC, 1 Amp unit.

The above discussed hardware and software configuration of the Internet phone 103 also includes a link control protocol routine (i.e., program) that provides for four modes of operation as follows:

| Mode | Power On | Internet Call/ Auto-Answer | Analog Call | Internet Call |
|---|---|---|---|---|
| 1 | Off | Don't Care | Yes | No |
| 2 | On | Off | Yes | Yes {Both parties need to be manually connected to Internet} |
| 3 | On | On | Yes | Yes {Both parties will be automatically connected to Internet} |
| 4 | On | On | Yes | Yes {Both parties will be automatically connected to Internet} |

In mode 1 the Internet phone 103 is in a sleeping mode in that it is by-passed from the Internet 104 and directly connected to the PSTN. In mode 1, all incoming or outgoing analog calls are directly connected to the PSTN.

Figure 3:
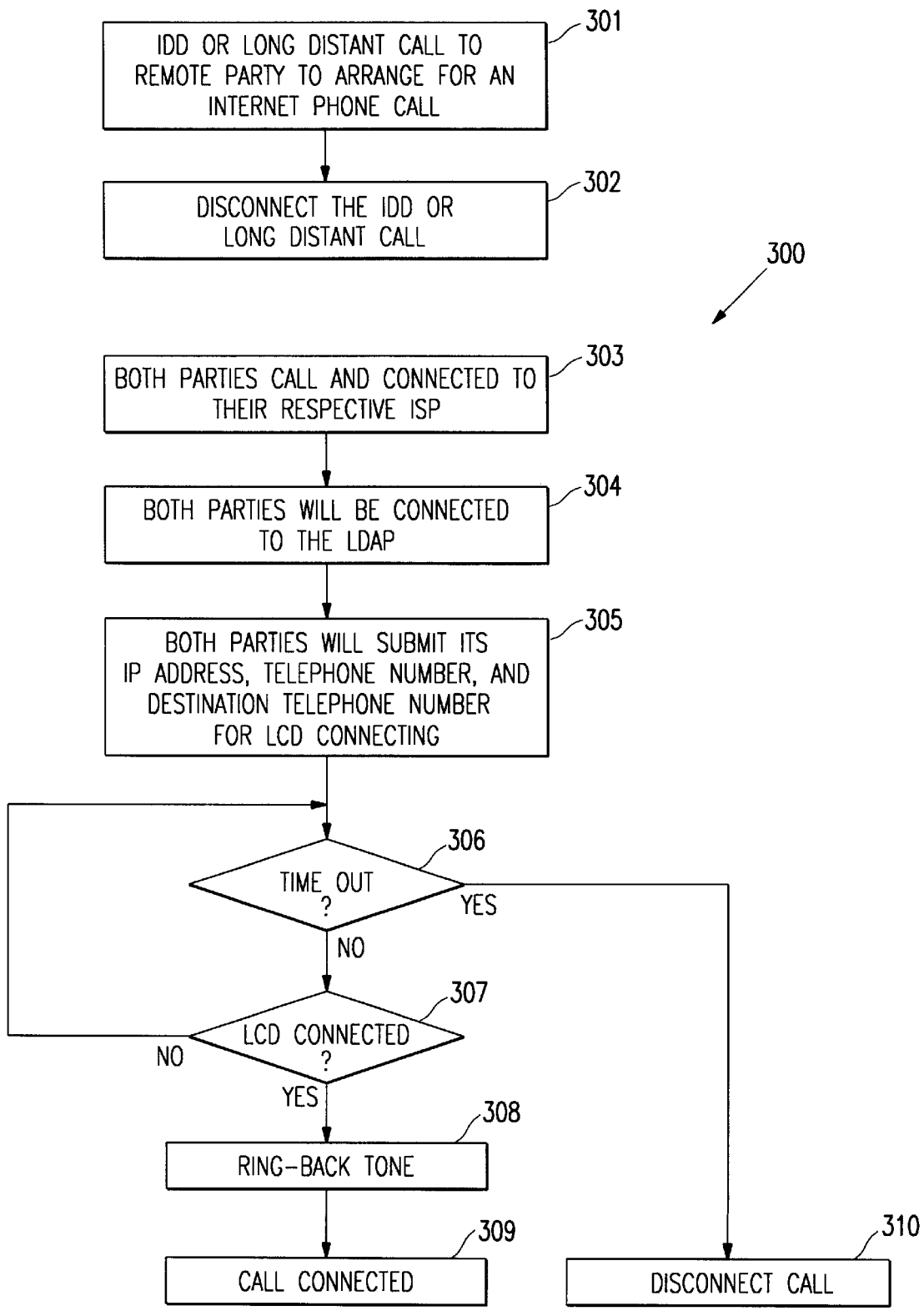
FIG. 3 is a flow chart of a manual Internet phone call setup for the Internet phone set-up box shown in FIG. 2.

In mode 2, both Internet phones 103 need to be manually connected to the Internet 104. The manual Internet phone call set up and tear down procedure is detailed by the flow chart 300 shown in FIG. 3. In mode 2, two phone calls are required to setup the connection over the Internet 104. Initially, the calling party manually calls the recipient party by an International Direct Dial (IDD) call service or long distance call service to verbally indicate that an Internet phone call is required 301. Upon agreement by the caller and recipient of an intended phone call over an Internet connection, the IDD or long distance call is disconnected 302. Both caller and recipient parties each activate the Internet Call/Auto Answer button and their respective Internet phones 103 automatically undertake to make an Internet connection, i.e. make a connection with their respective Internet Service Providers 303. Once connected to their ISPs, the caller and recipient Internet phones 103 each automatically connect to a Directory Service such as a Lightweight Directory Access Protocol (LDAP) 304. The LDAP is an open standard protocol for directory services on the Internet 104. The LDAP provides a standard way for Internet clients or applications and servers to access directory services and locate organizations, organizational units or individuals. Once connected to the Directory Service such as the LDAP, each of the caller and recipient Internet phones 103 automatically submit their IP address and telephone number, and the caller Internet phone 103 also submits the recipient Internet phone's telephone number. These connection procedures are indicated by the LCD display 305. Once the LCD connection is indicated as done 307, there will be a ring back tone to the Internet phones 103 of the caller and recipient parties 308 to indicate that the Internet connection for the intended phone call is established 309. If the LCD connection is not completed in a pre-programmed time interval 306, i.e., no ring back tone is received 308 by both the caller and recipient Internet phones 103 in W seconds, the caller and recipient Internet phones 103 disconnect from their respective ISP 310. Once established, the phone call over the Internet connection can be readily disconnected by de-activating the Internet Call/Auto-Answer button.

In mode 3, both Internet phones 103 are automatically connected over an Internet 104. The automatic Internet phone call setup and tear down procedure is detailed by flow chart 400 of FIG. 4. Initially, the calling party manually dials the IDD or long distance phone number 401 of the recipient party's Internet phone 103. With a reception of the manually dialed IDD or long distance telephone number, the caller's Internet phone 103 searches its phone book directory for a match with the manually dialed telephone number 402. When no match is made with the phone book directory listings, the caller's Internet phone 103 initiates an automatic dialing routine to notify the recipient party of an intended phone call over an Internet connection. The dialing routine for a non-match with the phone book directory listing is a differential automatic dial sequence as follows: First the caller's Internet phone 103 automatically calls the manually dialed IDD or long distance telephone number of the recipient party and provides a unique ringing sequence, while the recipient's Internet phone 103 correspondingly undertakes detection of the unique ringing sequence, then the call is disconnected. The calling party's Internet phone 103 needs to monitor the recipient's Internet phone 103 status through the tone detector as a dynamic way to determine the ringing duration, as an alternative to a fixed pre-defined ringing interval value. The prior steps of calling and detecting the unique ringing sequence and then disconnecting the call are repeated an N number of times 416, 417.

Tables 1 and 2 below show a few possible configurations of a differential automatic dialing and detection sequence as the unique ringing sequence.

TABLE 1

Caller Party Automatic Dialing and Detection Sequence

| Caller Party | | | | |
|---|---|---|---|---|
| Detect 1st Ringing Interval | 2 | 3 | 4 | 5 |
| Disconnect Call Interval {Second} | 1–10 | 1–10 | 1–10 | 1–10 |
| Detect 2nd Call Ringing Interval | 2 | 3 | 4 | 5 |
| Disconnect Call Interval {Second} | 1–10 | 1–10 | 1–10 | 1–10 |
| XXXXXX | | | | |
| Differential Ringing | 0 | 0 | 0 | 0 |

TABLE 2

Receipient Party Detections Sequence

| Recipient Party | | | | | | | | | | | | |
|---|---|---|---|---|---|---|---|---|---|---|---|---|
| Detect 1st Call Ringing Interval Disconnect Call Interval {Second} | 2 | 2 | 2 | 3 | 3 | 3 | 4 | 4 | 4 | 5 | 5 | 5 |
| Detect 2nd Call Ringing Interval Disconnect Call Interval {Second} | 1 | 2 | 3 | 2 | 3 | 2 | 3 | 4 | 5 | 4 | 5 | 6 |
| xxxxxxx Differential Ringing | 1 | 0 | 1 | 1 | 0 | 1 | 1 | 0 | 1 | 1 | 0 | 1 |

After the caller's Internet phone 103 has executed the automatic dialing routine, (i.e., differential automatic dialing sequence) and the recipient's Internet phone 103 has detected the automatic dialing routine, the Internet phones 103 will then automatically undertake to make an Internet connection. It should be noted that the detection of the differential dial sequence by the recipient side Internet phone 103 needs to be done in a pre-program time interval, for example, 15 to 120 seconds.

Figure 4:
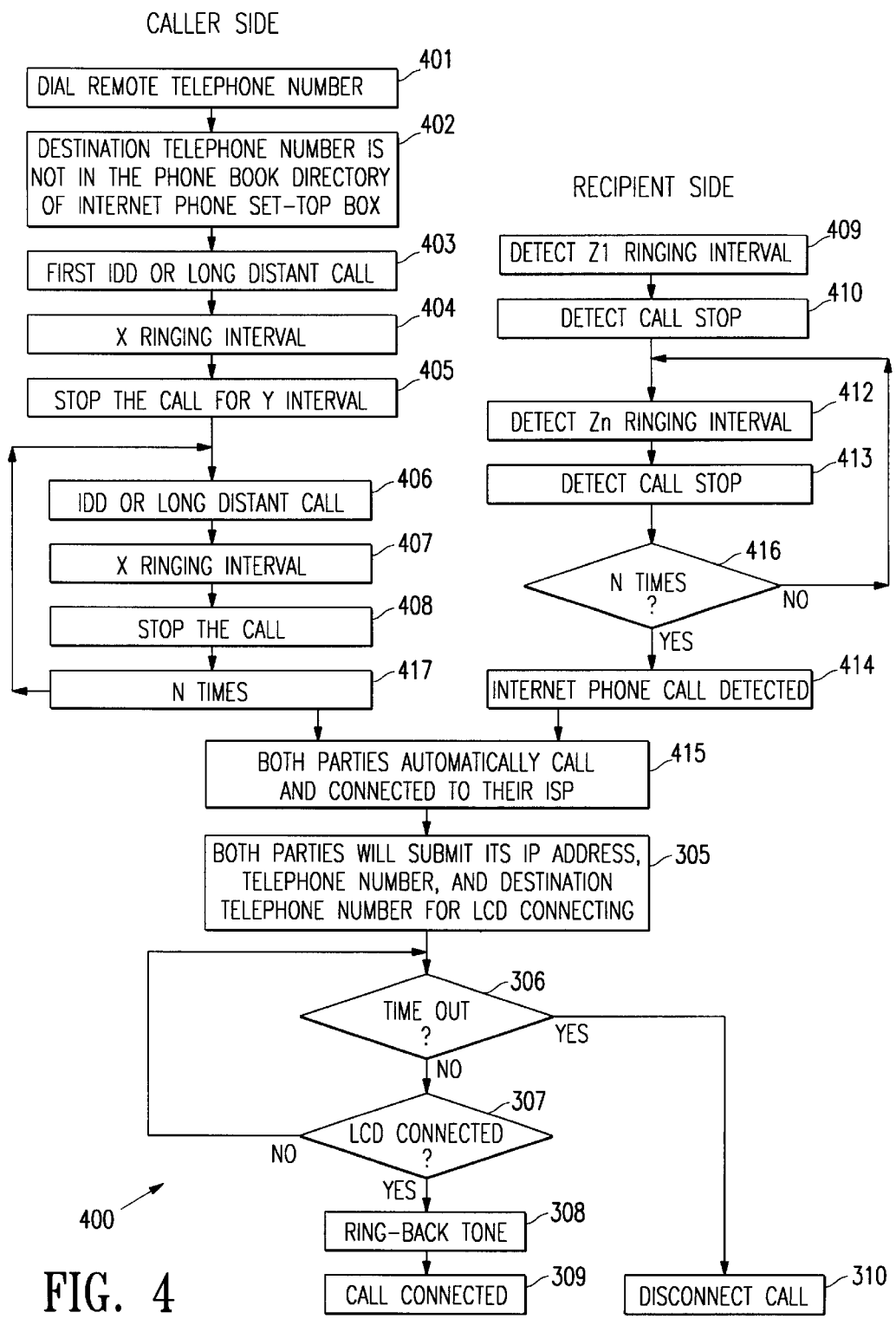
FIG. 4 is a flow chart of an automatic Internet phone call setup by a differential automatic dial sequence in accordance with the present invention.

More specifically, referring to FIG. 4, the caller party manually dials the recipient's telephone number 401. The caller's Internet phone 103 detects the manually dialed telephone number and checks it against an internally stored phone book directory listing 402. If there is no match with the phone book directory listing, the caller's Internet phone 103 automatically initiates, in response to the manual dialing by the caller, an automatic dialing routine that begins with an IDD or long distance call 403 to the recipient's Internet phone 103 with a predetermined X ringing interval 404. The recipient's Internet phone 103 correspondingly undertakes detection of a predetermined Z1 ringing interval 409. The caller's Internet phone 103 stops the call 403 for a predetermined Y interval 405, while the recipient's Internet phone 103 stops detection of the call 410. The caller's Internet phone 103 then repeats making the IDD or long distance call an N number of times 406 with a predetermined X ringing interval 407 during each N number call, while the recipient's Internet phone 103 undertakes detection of a predetermined Zn ringing interval 412 during each N number call. Then the caller's Internet phone 103 stops placing the long distance call 408 and the recipient's Internet phone 103 stops detection of the call 413. The recipient's Internet phone then 103 detects that a phone call over an Internet connection is desired 414 by the caller. The caller and recipient Internet phones 103 automatically call and undertake to make an Internet connection, i.e., become connected to their respective ISPs 415. Once connected to their respective ISPs, the caller and recipient Internet phones 103 automatically connect to the Directory Service such as the LDAP, the caller and recipient Internet phones 103 each submit their respective IP address and telephone number, and the caller additionally submits the recipient's telephone number 305. When the LCD displays an Internet connection 307, there will be a ring back tone to both parties 308 to indicate that the Internet call is established 309. If the LCD displayed connection is not done in a pre-programmed time interval 306, i.e., no ring back tone is received 308 by both the caller and recipient Internet phones 103 in W seconds, each of the caller and recipient Internet phones 103 disconnect from their respective ISP 310. Once established, the phone call over the Internet connection can be readily disconnected by de-activating the Internet Call/Auto-Answer button.

Figure 5:
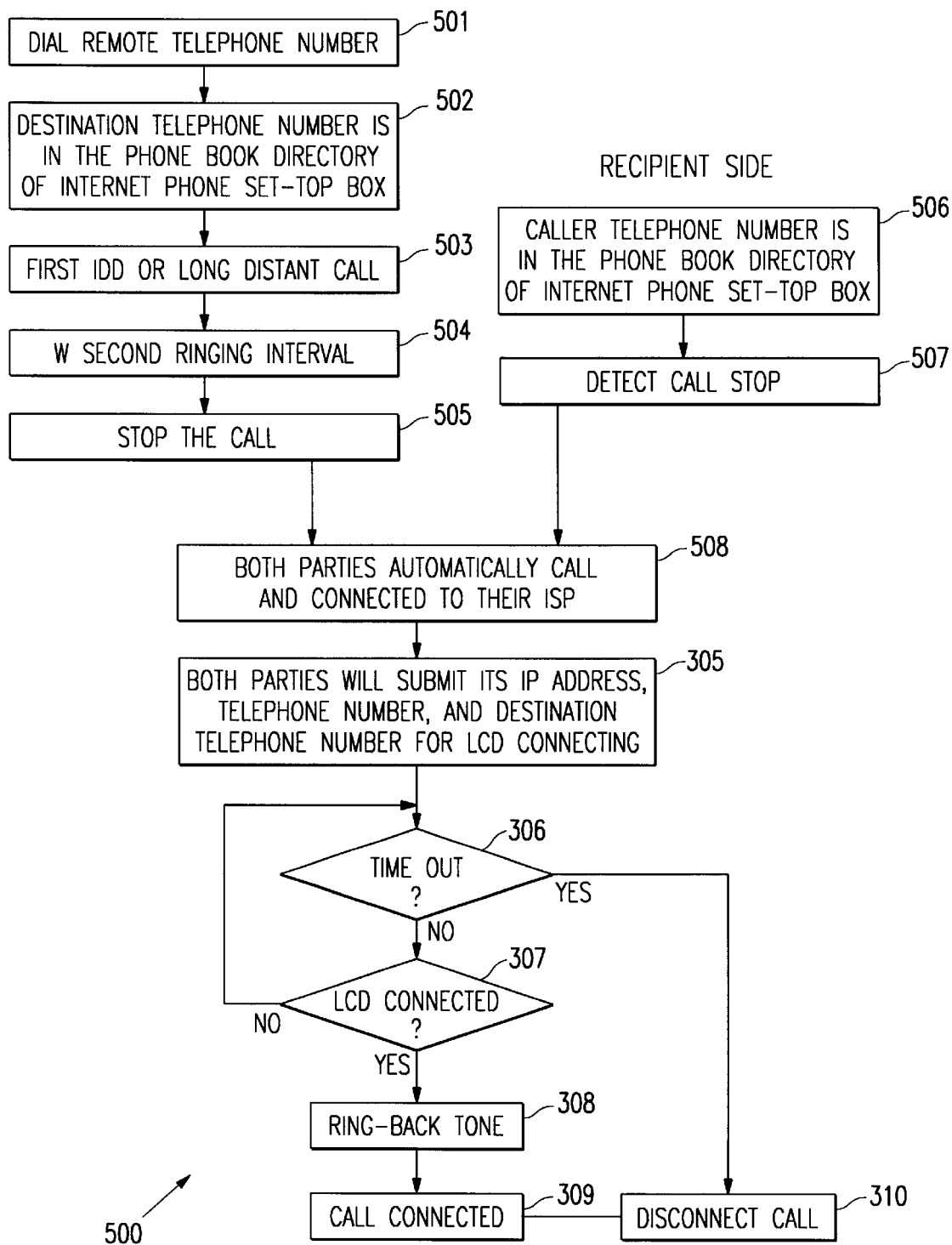
FIG. 5 is a flow chart of an automatic Internet phone call setup by a phone book directory in accordance with the present invention.

In mode 4, both parties are automatically connected to the Internet 104. The automatic Internet phone call setup and tear down procedure is detailed by flow chart 500 of FIG. 5. Initially, the calling party manually dials the IDD or long distance telephone number 501. With reception of the IDD or long distance telephone number, the phone 103 undertakes a match of the IDD or long distance number with a phone book directory 502.

With a match to a listing in the phone book directory, the caller's Internet phone 103 initiates an automatic dialing routine that includes one IDD or long distance call 503 to the recipient's Internet phone 103 with a W second ringing interval 504, e.g., 1–60 seconds, and then the caller's Internet phone 103 stops the call 505. Correspondingly, the recipient's Internet phone 103, has the caller's telephone number in its phone book directory and, undertakes a detection of the dialing routine 506 and then stops the detection 507. Then the calling and recipient Internet phones 103 automatically undertake to make an Internet connection, i.e., call and be connected to their respective ISPs 508, and then connect to the Directory Service such as the LDAP. Once connected to the LDAP, each of the caller and recipient Internet phones 103 submit their respective IP address and telephone number. The caller Internet phone also submits the recipient's telephone number. When the LCD displays an Internet connection 307, there will be a ring back tone to both parties 308 to indicate that the Internet call is established 309. If the LCD displayed connection is not done in a pre-programmed time interval 306, i.e., no ring back tone is received 308 by both the caller and recipient Internet phones 103 in W seconds, each of the caller and recipient Internet phones 103 disconnect from their respective ISP 310. Once established, the phone call over the Internet connection can be readily disconnected by de-activating the Internet Call/Auto-Answer button.

It can be appreciated that the above hardware and software configuration can be practiced to provide tele-conference capabilities between multiple phone parties. The tele-conference can be with all parties interconnected through an Internet connection and an Internet phone and the above software and hardware configurations modified to provide for full duplex communications between all the parties. Alternatively, two parties can be connected over the Internet as described above, and multiple parties can be brought into the phone call connection through connections over the PSTN into the phones 101. In this case the relay would be in an additional mode whereby the phone 101 is in both a PSTN mode and an Internet mode.

The above two techniques of automatic dialing to establish a phone call over the Internet 104, by the Internet phone set-top box 103, or a PC configured with the capabilities of the Internet phone 103, can be affected by the timing required to establish the connection. In other words, the connection time could be just a few seconds for a local recipient connected indirectly to a local network interconnection between the calling and recipient parties, while the connection time could be tens of seconds for an overseas recipient connected indirectly through an international network interconnection between the calling and recipient parties. Consequently, the ringing interval parameters in the automatic dialing and detection must be fine tuned to compensate for timing delays due to interconnection variations on the network.

The timing delays in the differential dialing sequence between peer-to-peer communication, i.e. calling party-to-recipient party via their respective Internet phones 103, can be avoided if the differential dialing sequence is moved from the Internet phone 103 to a so called knocking server on the Internet. With such a knocking server a shorter duration in the ringing interval is possible, which permits establishment of a more reliable call connection. In addition, the knocking server, by initiating the differential dialing sequence with a recipient party's Internet phone 103, can enable a PC station with Internet connection capabilities to prompt the knocking server to execute an automatic dialing sequence from the Internet, in order to establish a phone call over the Internet with a recipient party's Internet phone 103 or computer station.

Figure 6:
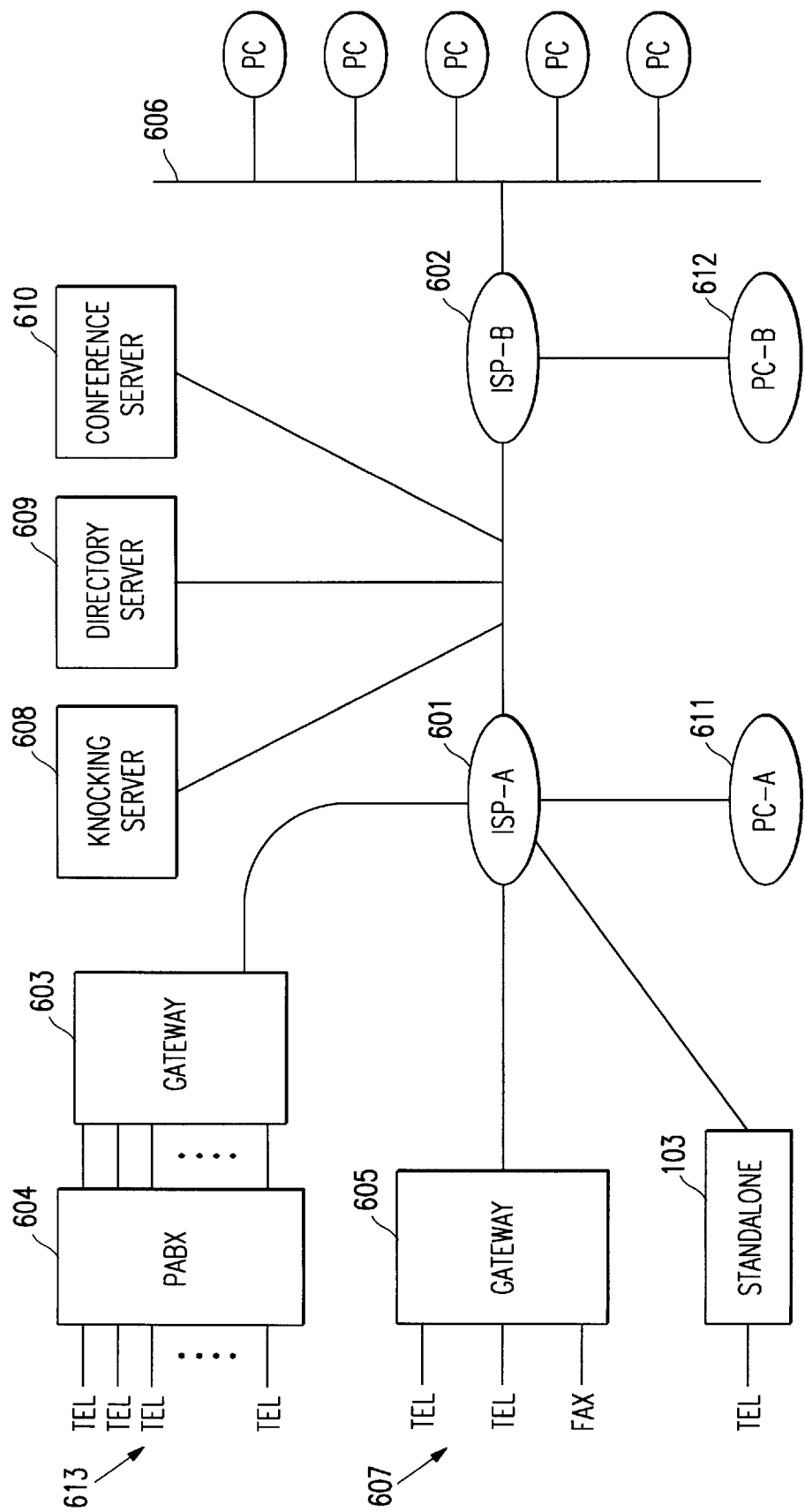
FIG. 6 is a block diagram of an Internet telephone network configuration employing knock servers to recite automatic dialing to establish a phone call over the Internet.

Referring now to FIG. 6 there is shown a block diagram 600 of an Internet telephony network configuration employing a knocking server 608 for executing automatic dialing to a recipient over the Internet. A first Internet service provider (ISP) 601 is connected to a first gateway 603 tied to a private automatic branch exchange (PABX) 604 serving multiple telephones 613, a second gateway 605 servicing end use equipment 607 such as telephones and a facsimile, a stand-alone Internet phone 103 connected to a telephone (or a stand-alone telephone connected to equipment configured with capabilities of the Internet phone 103 such as differential dialing detection and Internet communication capabilities), and a personal computer station 611. Connected to a second Internet service provider (ISP) 602 are a local area network (LAN) 606 of computer stations, and a single personal computer station 612. The Internet service providers 601 and 602 are connected to each other, and to a knocking server 608, a directory server 609, and a conference server 610.

The diagram 600 of FIG. 6 is intended only as an example of the possible end user equipment interconnections to the Internet with ISPs 601 and 602, knocking server 608, directory server 609 and conference 616 server, that will support phone, facsimile, voice mail, video mail, and other services. Consequently, at a minimum, the knocking server 609 need only be utilized in conjunction with the Internet phone 103 of a recipient party or other end user equipment connected to the Internet, such as the single computer station 611, that is capable of detecting the differential dialing presented by the knocking server 608.

Gateways, such as 603 and 605, are devices used to connect dissimilar networks using different communication protocols, so that information can be passed from one network to the other. The gateway both transfers information and converts it to a form compatible with the protocols used by the second network for transport and delivery. The second gateway 605 of FIG. 5 transfers and converts the signals from the end user equipment 607 into an Internet, compatible format. The first gateway 603 of FIG. 6 transfers and converts signals from the PABX 604 into an Internet compatible format. The PABX 604 is a private telecommunications exchange that includes access to a public telecommunications exchange, e.g. telephone switching system.

The conference server 610, shown interconnected between the ISPs 601 and 602, is configured to simultaneously transmit and receive multiple voice based data packets on the Internet, in order to support multi-party phone calls over the Internet.

The directory server 609, shown interconnected between the ISPs 601 and 602, is configured for directory services such as the lightweight Directory Access Protocol (LDAP) detailed above.

The personal computers (PC) PC 611, connected to the first ISP 601, and PC 612, connected to the second ISP 602, each can have modem function capabilities or a leased line access for linking with the respective ISP's 601 and 602. The LAN 606 of personal computers can be connected to its ISP 602 by a dedicated leased line. A wide area network (WAN) of personal computers can be interconnected to the Internet and employ the knocking server 608 to initiate a automatic dialing sequence. Personal computers, can be used as a source or destination of video, graphics, audio and user data.

The knocking server 608 is configured to provide automatic differential dialing for a caller party, not having an Internet phone 103, to preferably a recipient party with the Internet phone 103 detailed above. The knocking server 608 can also be employed to establish a phone call connection over the Internet with a recipient's personal computer configured to detect the automatic differential dialing sequence by the knocking server 608.

Figure 7:
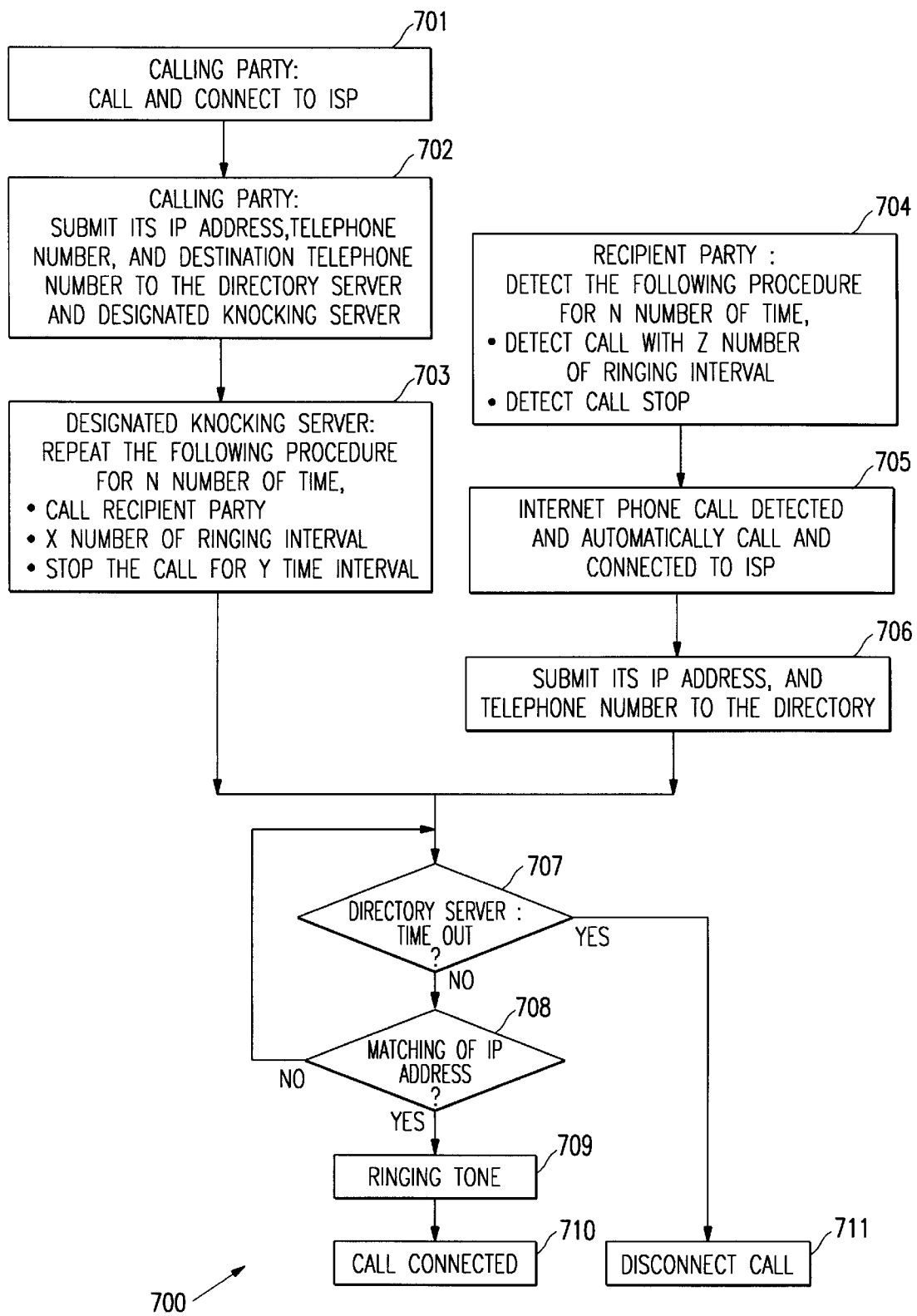
FIG. 7 is a flow chart of an Internet phone call setup employing the knocking server of FIG. 6.

Referring now to the flow chart 700 of FIG. 7, the steps for an Internet phone call setup with the knocking server 608 are detailed. Initially, the calling party dials out to make a connection with its ISP 701. Once connected to the ISP 701, the calling party submits its IP address, its telephone number, and the recipient's telephone number to both the directory server and a designated knocking server 702. The designated knocking server will then initiate an automatic dialing sequence 703 through a local or long distance telephone call to the recipient party. The proposed automatic dialing sequence, i.e., differential dialing sequence, consists of the knocking server repeating, an N number of times, an X number of ringing intervals followed by no rings for a Y time interval. Correspondingly, the recipient party's Internet phone 103 (or similarly configured PC or end equipment setup) answers the local call, and undertakes detection of the incoming dialing over a Z number of ringing intervals, repeated for an N number of times, followed by a stop in the detection of the call, and then the call is disconnected 704. The detection of the differential dial sequence by the recipient party needs to be done in a pre-programmed time interval, for example 3 to 30 seconds. Possible configurations of the differential automatic dialing and detection sequence are shown below in Tables 1 and 2:

TABLE 1

Knocking server automatic call dialing and detection sequence

Knocking Server

| | | | | |
|---|---|---|---|---|
| Detect 1st call ringing interval | 2 | 3 | 4 | 5 |
| Disconnect call interval [second] | 1–10 | 1–10 | 1–10 | 1–10 |
| Detect 2nd call ringing interval | 2 | 3 | 4 | 5 |
| Disconnect call interval [second] | 1–10 | 1–10 | 1–10 | 1–10 |
| ....... | | | | |
| Differential ringing | 0 | 0 | 0 | 0 |

TABLE 2

Recipient party detection sequence

Recipient Party

| | | | | | | | | | | |
|---|---|---|---|---|---|---|---|---|---|---|
| Detect 1st call ringing interval | 2 | 2 | 2 | 3 | 3 | 3 | 4 | 4 | 4 | 5 |
| Disconnect call interval [second] | — | — | — | — | — | — | — | — | — | — |
| Detect 2nd call ringing interval | 1 | 2 | 3 | 2 | 3 | 2 | 3 | 4 | 5 | 4 |
| Disconnect call interval [second] | — | — | — | — | — | — | — | — | — | — |
| ....... | | | | | | | | | | |
| Differential ringing | 1 | 0 | −1 | 1 | 0 | −1 | 1 | 0 | −1 | 1 |

After the automatic dialing or detection of the initiation, the recipient party's Internet phone 103 will then automatically call and be connected to its ISP 705. Then the recipient submits its IP address and its telephone number to the directory server such as the LDAP 706. Once an LCD connection is done, i.e. a matching of the IP address by the Directory server 708 within a pre-programmed time interval 707, a ring back tone is provided to both parties 709 and the Internet call is established 710.

If the LCD connection is not made, i.e. there is no matching of the IP address against a directory listing in a pre-programmed time interval, then both the calling and recipient parties are disconnected from their respective ISPs. The Internet call can be easily disconnected by de-activating the Internet Call/AutoAnswer button.

Alternatively, the knocking server 608 can be configured so that if during the local phone call to the recipient, before initiating the differential dialing sequence, a busy tone is detected indicating that the recipient may already be on an Internet connection, the knocking server can search the directory server for the telephone number and IP address of the recipient and attempt an Internet phone call connection over the Internet.

The knocking server 608, as detailed by the discussion of the flow chart 700, allows for an automatic dialing and call establishment technique over the Internet that is an alternative to peer-to-peer automatic dialing. The designated knocking server can be a local knocking server, located nearest to the recipient party, that will reduce connection time required as compared to the differential dialing sequence between an Internet phone 103 to an Internet phone 103. Alternatively, the designated knocking server can be a remote knocking server, located nearest to the calling party that can serve other PCS connected to an LAN or WAN that is leased-line connected to an ISP.

The source and destination telephone number matching provided by the directory server is a simpler and more reliable matching technique for establishing a call connection. The telephone numbers of the calling and recipient parties are now unique identifications on the directory server.

The use of the knocking server 608 permits the calling party's equipment to be any type capable of communicating over the Internet, including a gateway, stand alone Internet phone, a PC connected to an LAN or WAN, PC connected to the Internet via a modem, and an electronic mail server for automatic mail notification. Likewise, similar type of equipment can be used by the recipient party if it is configured for the detection of the differential dialing sequence over the local telephone call.

The knocking server 608 can be configured with a look-up table containing various parameters such as the X ringing interval, Y interval, and the N number of repetitions. The look-up table can enable fine tuning of the differential dialing to adapt to different call dialing delays caused by the interconnection of different PSTN switches. The look-up table can have values for the X, Y and N parameters based on telephone calls between various cities or area codes. In this way, a simpler matching technique is provided, which establishes an automatic call connection by matching source and destination locations on the Internet and allows for fine tuning the connection timing.

The disclosures of the following U.S. patents are incorporated herein by reference to the extent necessary or desirable to explain the invention: Barris U.S. Pat. No. 5,434,797 granted Jul. 18, 1995; Hollenback, et al. U.S. Pat. No. 5,533,155 granted Jul. 2, 1996; and Fox, et al. U.S. Pat. No. 5,636,216 granted Jun. 3, 1997.

Variations, combinations and permutations of the above as would occur to those of ordinary skill in the art are included in the scope and spirit of the invention. For example, the above described Internet phone 103 can be utilized with a facsimile input device, in lieu of or in combination with the external phone 101 or microphone-speaker 102 set, in conjunction with the automatic dialing and call setups based on the differential ringing sequence of mode 3, or the single ringing interval of mode 4. With regard to the differential ringing sequences described, an interval of the predetermined ringing can be substituted by a duration to a tone detection of a ringing tone by the recipient party's communication equipment. The caller party's communication equipment would be usable to detect the ringing tone of the recipient party's communication equipment through a tone detection by a modem of the caller party's communication equipment as a dynamic way to determine an interval of the predetermined ringing. Also, the above described programs, automatic dialing routines and hardware functions can be configured into a personal computer system that executes the automatic dialing routine to automatically setup a phone call over an Internet connection.

What is claimed is:

1. A method for establishing a phone call over an Internet connection, said method comprising the steps of:

making an Internet connection by caller party communication equipment intending to establish a phone call connection over said Internet connection with recipient party communication equipment;

providing by said caller party communication equipment said caller party communication equipment's Internet Protocol address and telephone number and said recipient party communication equipment's telephone number to a directory server and knocking server on said Internet connection;

initiating, at said knocking server, a dialing routine to said recipient party communication equipment to notify said recipient party communication equipment of an intended phone call connection over said Internet connection;

making an Internet connection by said recipient party communication equipment in response to said recipient party communication equipment detecting said dialing routine by said knocking server;

providing automatically to said directory server, by said recipient party communication equipment, said recipient party communication equipment's Internet protocol address and telephone number; and completing automatically said Internet connection between said caller and recipient party communication equipment for said intended phone call.

2. The method according to claim 1, wherein said dialing routine comprises a differential ringing sequence detectable by said recipient party communication equipment.

3. The method according to claim 2, wherein said differential ringing sequence comprises providing a predetermined ringing and then disconnecting said telephone connection to said recipient party communication equipment for a predetermined stop interval, and then repeating automatically for a given number of times another telephone connection to said recipient party communication equipment followed by said predetermined ringing and then disconnecting said another telephone connection.

4. The method according to claim 3, wherein an interval of said predetermined ringing can be substituted by a duration to a tone detection of a ringing tone of said recipient party communication equipment, said knocking server being usable to detect said ringing tone of said recipient party communication equipment through a tone detection of a modem of said knocking server as a dynamic way to determine said interval of said predetermined ringing.

5. The method according to claim 1, wherein said directory service is a Lightweight Directory Access Protocol (LDAP).

6. The method according to claim 1, wherein said knocking server is located nearer said recipient party communication equipment than said caller party communication equipment on said Internet connection between said caller and recipient party communication equipment.

7. The method according to claim 1, wherein said knocking server is located nearer said caller party communication equipment than said recipient party communication equipment on said Internet connection between said caller and recipient party communication equipment.

8. The method according to claim 3, wherein said differential ringing sequence is based on at least one of geographic locations of each of said knocking server and recipient party communication equipment and condition of transmission paths in said Internet connection.

9. The method according to claim 8, wherein said differential ringing sequence comprises parameters based on an interval of said predetermined ringing, said predetermined stop interval, and number of times said predetermined ringing and said predetermined stop interval are repeated, said parameters for said predetermined ringing, said predetermined stop interval and said number of times being composed as a look-up table at said knocking server, said parameters being based on said geographic locations and said transmission path.

10. The method according to claim 1, wherein said caller party communication equipment comprises at least one of a gateway servicing telephone equipment, a local area network of personal computers, a stand alone personal computer, and an Internet phone.

11. The method according to claim 1, wherein said recipient party communication equipment comprises at least one of a gateway servicing telephone equipment, a local area network of personal computers, a stand alone personal computer, and an Internet phone.

12. The method according to claim 1, wherein said knocking server is configured for attempting an Internet connection with said recipient party communication equipment if a busy tone is received when said knocking server executes said notifying.

* * * * *

UNITED STATES PATENT AND TRADEMARK OFFICE
CERTIFICATE OF CORRECTION

| | | |
|---|---|---|
| PATENT NO. | : 6,243,376 B1 | Page 1 of 1 |
| APPLICATION NO. | : 08/963543 | |
| DATED | : June 5, 2001 | |
| INVENTOR(S) | : Ede Phang Ng et al. | |

It is certified that error appears in the above-identified patent and that said Letters Patent is hereby corrected as shown below:

On the title page under "Foreign Patent Documents" please delete "WO 98/3008 7/1998 (WO)." and replace with --WO 98/30008 7/1998 (WO).--.

On the title page under "Other Publications" please replace "Business & Technolgoy" with --Business & Technology--.

At column 14, replace lines 42 to line 49 with the following:

--4. The method according to claim 3, wherein an interval of said predetermined ringing can be substituted by a duration to a tone detection of a ringing tone by said recipient party communication equipment, said caller party communication equipment being usable to detect said ringing tone of said recipient party communication equipment through a tone detection of a modem of said caller party communication equipment as a dynamic way to determine said interval of said predetermined ringing.--.

At Column 15, Claim 10, line 13, please replace "servicing" with --receiving--.

Signed and Sealed this

Twenty-sixth Day of August, 2008

JON W. DUDAS
*Director of the United States Patent and Trademark Office*